UNITED STATES PATENT OFFICE.

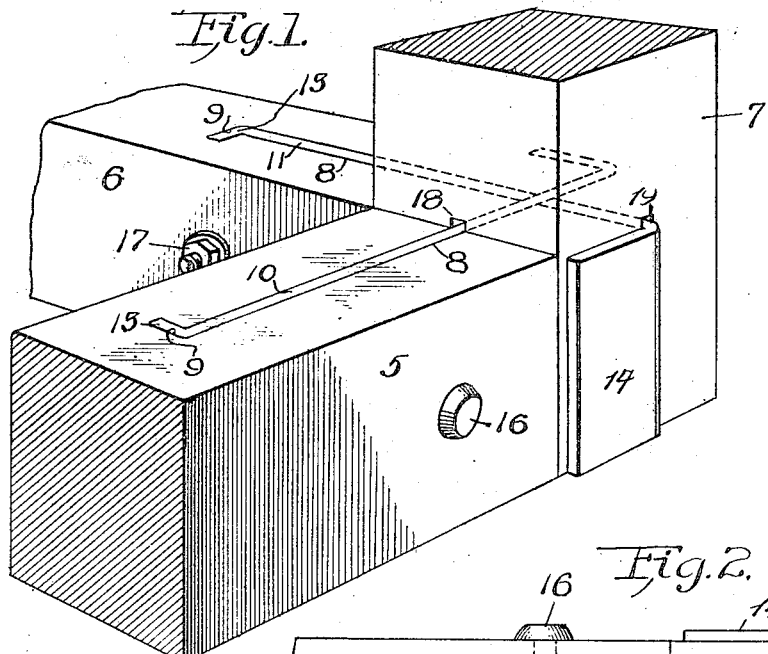
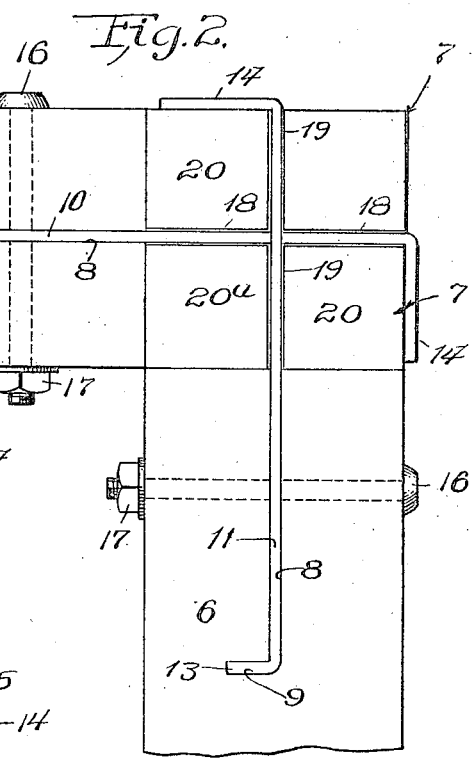
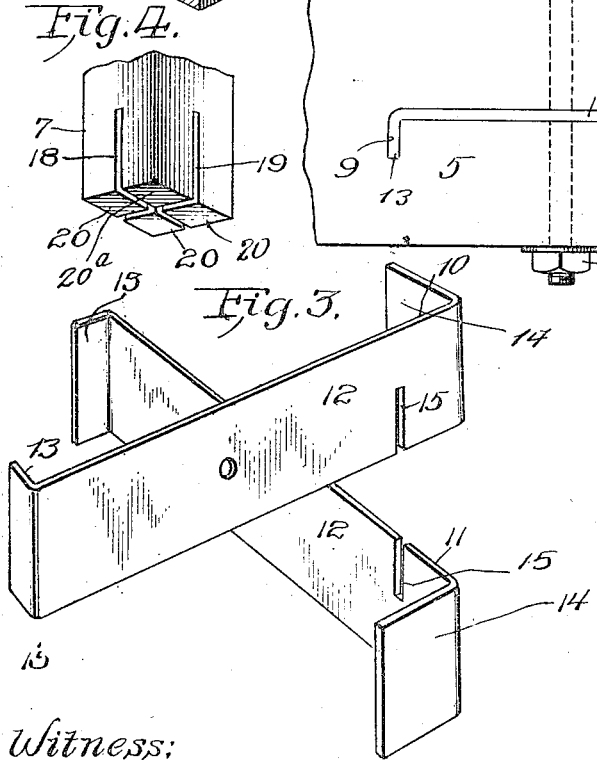

BENJAMIN LOEWINGER, OF CHICAGO, ILLINOIS, ASSIGNOR TO PAKORN & CO., OF CHICAGO, ILLINOIS, A COPARTNERSHIP COMPOSED OF SAID BENJAMIN LOEWINGER AND JOSEPH PAKORN.

CORNER CONSTRUCTION FOR BUILDINGS.

1,258,920.      Specification of Letters Patent.      Patented Mar. 12, 1918.

Application filed March 30, 1917. Serial No. 158,533.

*To all whom it may concern:*

Be it known that I, BENJAMIN LOEWINGER, a citizen of the United States, and a resident of Chicago, county of Cook, and State of Illinois, have invented certain new and useful Improvements in Corner Constructions for Buildings, of which the following is declared to be a full, clear, and exact description.

This invention relates to corner constructions for buildings, and more particularly for portable buildings, such as garages, summer houses, and the like. The primary object of this invention is to provide a corner construction capable of being readily assembled by persons unskilled in the carpentry art. Another object is to provide a strong, substantial and rigid corner construction of comparatively simple and inexpensive form. With these and other objects and advantages in view, this invention consists in the several novel features hereinafter fully set forth and claimed.

The invention is clearly illustrated in the drawing accompanying this specification, in which:

Figure 1, is a perspective view of a corner construction, embodying a simple form of the present invention; Fig. 2, is an under plan of the parts seen in Fig. 1; Fig. 3, is a perspective view of the anchoring iron members employed for securing the sills and upright together at the corner, and Fig. 4, is a perspective view of a fragment of the upright member.

Referring to said drawings, the reference numerals 5, 6, designate fragments of the two sills, and 7, a fragment of the upright member, forming one of the corners of the building. The upright member extends down along the ends of the sills, and rests upon the same surface as the sills. The latter are formed with vertical, lengthwise extending slots or saw kerfs 8, which extend inward from their ends, and the inner ends of said slots 8, have transverse portions 9. Secured in said slots, are anchoring irons 10, 11, each of which comprises a lengthwise extending portion 12, part of which is held in the slot 8, and part of which protrudes from the end of the sill. One end 13, thereof is bent at right angles to the main portion, and is contained in the transverse slot 9, and the other end 14, is also bent at right angles to the main portion. Each anchoring iron 10, 11, is formed with a vertical notch 15, near its outer end, the one opposing the other, which permits the anchoring irons to be interlocked while lying in the same plane and at right angles to each other. Preferably, said anchoring irons are fixedly secured to the sills, by bolts 16, passing through the sills and anchoring irons, and having nuts 17, threaded upon their threaded ends. The uprights 7, are formed with vertical slots or saw kerfs 18, 19, extending upward from their ends, said slots being formed at right angles to each other, and being approximately of the same height as the thickness of the sills.

The sills are cut to suitable lengths at the factory, the slots formed therein, and the anchoring irons secured thereto, and the uprights are cut to the proper lengths, and formed with the slots, or saw kerfs, in their ends. In this form, the sills and uprights are shipped to the place where the building is to be erected. The sills are then laid upon the ground or upon concrete or wooden posts, if desired, and the protruding portions of the anchoring irons are interlocked by passing the notched portion of the one over the notched portion of the other. The upright is then placed in the open corner left between the adjacent ends of the sills, the protruding portions of the anchoring irons entering the notches or saw kerfs 18, 19. The three parts 20, 20ª, are held between said protruding portions of the anchoring iron, and the end faces of the sills, the bent ends 14, of the anchoring irons engaging the outer faces of said parts 20, of the upright. It is to be observed that by reason of the particular construction shown and described, the upright is held tightly against the ends of the sills, whereby it is fixedly maintained in an upright position, and all of the parts are rigidly connected together. It is also to be observed that the same corner construction may be employed at the top of the uprights for the roof construction. After the sills, uprights and headers have been secured together, to form the frame work of the building, the floor, walls and roof (not shown) may be secured to the framework in any desirable manner.

I claim as new, and desire to secure by Letters Patent:

1. A corner construction for portable buildings, comprising three frame members, each extending at right angles to the other, two of said frame members having vertical lengthwise running slots extending inward from their ends, and the third frame member having vertical lengthwise running slots across its entire end and extending inward from its end in alinement with the slots of the other frame members, and anchoring irons secured in the slots of the first mentioned two members, and extending through the slots of the third member, said anchoring irons crossing each other in the third member and having interlocked portions therein, and having right angled bends at their outer ends, embracing the third mentioned frame member.

2. In a corner construction for portable buildings, two sills arranged in the same plane and extending at right angles to each other, an upright member extending up from the open corner between said sills, the sills and upright member being formed with alined vertical lengthwise extending slots, the slots in the upright member extending across its entire end, and two anchoring irons secured in the slots of the sills, and having interlocked portions extending through the slots in the upright member, and having right angled bends at their outer ends projecting toward the sills, engaging the sides of said upright member.

3. In a corner construction for portable buildings, two sills lying in the same plane, and arranged at right angles to each other, an upright member extending up from the open corner between said sills, said sills being formed with vertical lengthwise extending slots at their end portions, the slots terminating in crosswise extending portions at their inner ends, and the upright member being formed with vertical slots, alining with the slots of the sills, and extending across the entire end of said member and two anchoring irons having portions secured in the lengthwise extending parts of the slots in the sills, and right angled bends at their inner ends lying in the transverse portions of said slots, and having notched, interlocked portions in the slots of the upright member, and formed with right angled bends at their outer ends projecting toward the sills and engaging the sides of the upright member.

4. A corner construction for portable buildings comprising three frame members, each extending at right angles to the others, and two of said members abutting against the third member, said two members being formed with lengthwise extending slots in their end portions, and the third member being transversely slotted from side to side in two lines coinciding with the slots of said other two members, and anchoring irons secured in the slots of said other two members, each having portions extending through a registering slot in the third member, said anchoring irons being interlocked at the intersecting points of the slots in the third member, and having end portions bent at right angles to the main portion, bearing against the outer faces of the third member.

5. In a corner construction for portable buildings, a pair of anchoring irons comprising lengthwise extending portions, each having a notch opposed to the other, extending inward from an edge, whereby the two angle irons may be interlocked when lying at right angles to each other, each angle iron having right angled bends at its ends extending in the same direction, said irons being arranged to be secured to sills of the building.

BENJAMIN LOEWINGER.